US012645872B2

(12) United States Patent
Symborski et al.

(10) Patent No.: US 12,645,872 B2
(45) Date of Patent: Jun. 2, 2026

(54) UTILIZING DYNAMICALLY GENERATED STATE MACHINES TO EXECUTE CONVERSATIONAL FLOWS IN A SOFTWARE APPLICATION

(71) Applicant: INTUIT INC., Mountain View, CA (US)

(72) Inventors: John Patrick Symborski, Alberta (CA); Rachit Sengupta, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 174 days.

(21) Appl. No.: 18/621,331

(22) Filed: Mar. 29, 2024

(65) Prior Publication Data

US 2025/0307541 A1     Oct. 2, 2025

(51) Int. Cl.
*G06F 40/20* (2020.01)

(52) U.S. Cl.
CPC ................................... *G06F 40/20* (2020.01)

(58) Field of Classification Search
CPC .............................. G06F 40/20; G06F 40/35
See application file for complete search history.

(56) References Cited

U.S. PATENT DOCUMENTS

| | | | |
|---|---|---|---|
| 11,430,446 B1 * | 8/2022 | Wen | H04L 51/02 |
| 2015/0160955 A1 * | 6/2015 | Authement | G06F 30/331 |
| | | | 703/23 |
| 2020/0356349 A1 * | 11/2020 | Jain | H04N 21/4586 |
| 2022/0245340 A1 * | 8/2022 | Yang | G06F 18/24 |
| 2023/0153541 A1 * | 5/2023 | Carbajales | G06N 3/08 |
| | | | 704/9 |
| 2024/0265211 A1 * | 8/2024 | Mihai | H04L 51/02 |

* cited by examiner

*Primary Examiner* — Darioush Agahi
(74) *Attorney, Agent, or Firm* — Patterson + Sheridan, LLP

(57) ABSTRACT

Aspects of the present disclosure provide techniques for dynamic state machine based conversational flow execution in a software application. Embodiments include receiving a natural language query via a user interface and using a classification machine learning model to determine an intent identifier based on the natural language query. Embodiments include selecting, based on the intent identifier, a conversational flow template that specifies conversational logic via blocks and edges. Embodiments include dynamically generating a state machine comprising an initial state corresponding to a point within the selected conversational flow template that is associated with the intent identifier and one or more additional states and conditions generated based on a subset of the blocks and the edges of the conversational flow template. Embodiments include executing the dynamically generated state machine in order to automatically generate a response to the natural language query and providing the response via the user interface.

14 Claims, 6 Drawing Sheets

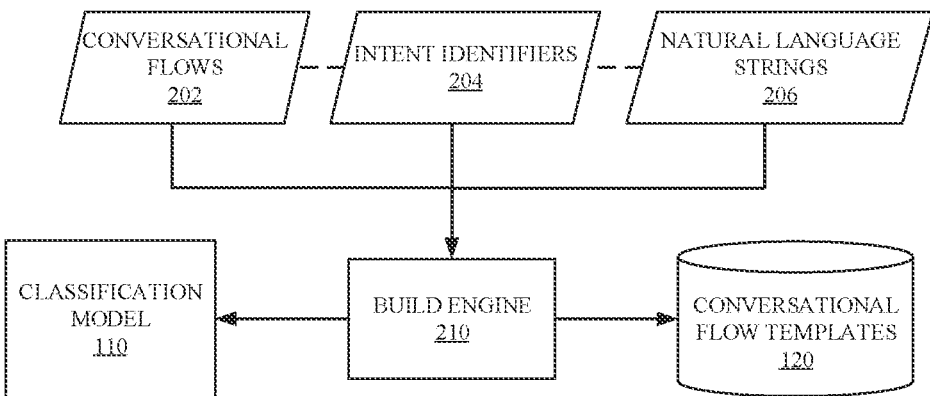
FIG. 2

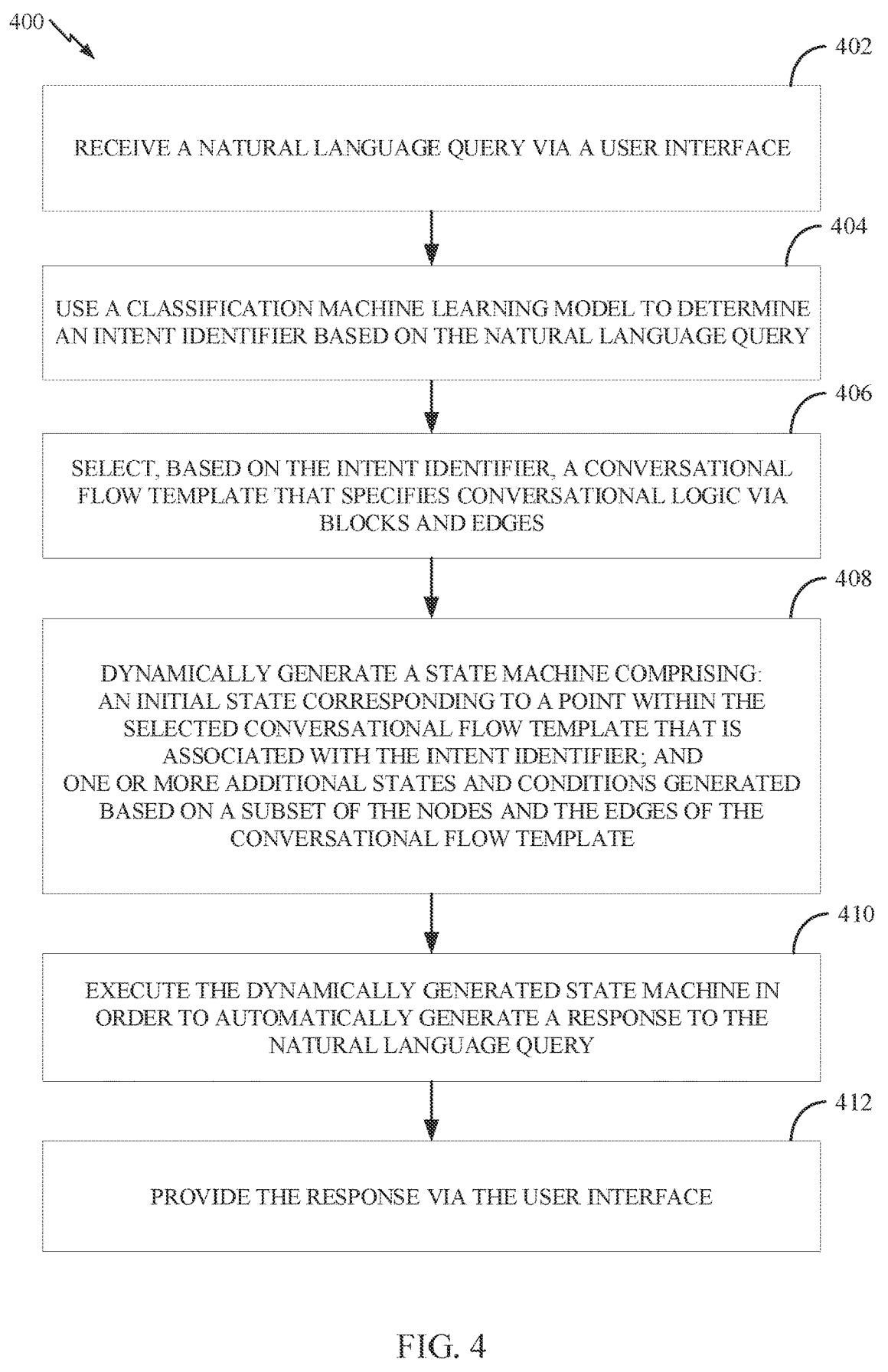

400

402

RECEIVE A NATURAL LANGUAGE QUERY VIA A USER INTERFACE

404

USE A CLASSIFICATION MACHINE LEARNING MODEL TO DETERMINE AN INTENT IDENTIFIER BASED ON THE NATURAL LANGUAGE QUERY

406

SELECT, BASED ON THE INTENT IDENTIFIER, A CONVERSATIONAL FLOW TEMPLATE THAT SPECIFIES CONVERSATIONAL LOGIC VIA BLOCKS AND EDGES

408

DYNAMICALLY GENERATE A STATE MACHINE COMPRISING:
AN INITIAL STATE CORRESPONDING TO A POINT WITHIN THE SELECTED CONVERSATIONAL FLOW TEMPLATE THAT IS ASSOCIATED WITH THE INTENT IDENTIFIER; AND
ONE OR MORE ADDITIONAL STATES AND CONDITIONS GENERATED BASED ON A SUBSET OF THE NODES AND THE EDGES OF THE CONVERSATIONAL FLOW TEMPLATE

410

EXECUTE THE DYNAMICALLY GENERATED STATE MACHINE IN ORDER TO AUTOMATICALLY GENERATE A RESPONSE TO THE NATURAL LANGUAGE QUERY

412

PROVIDE THE RESPONSE VIA THE USER INTERFACE

FIG. 4

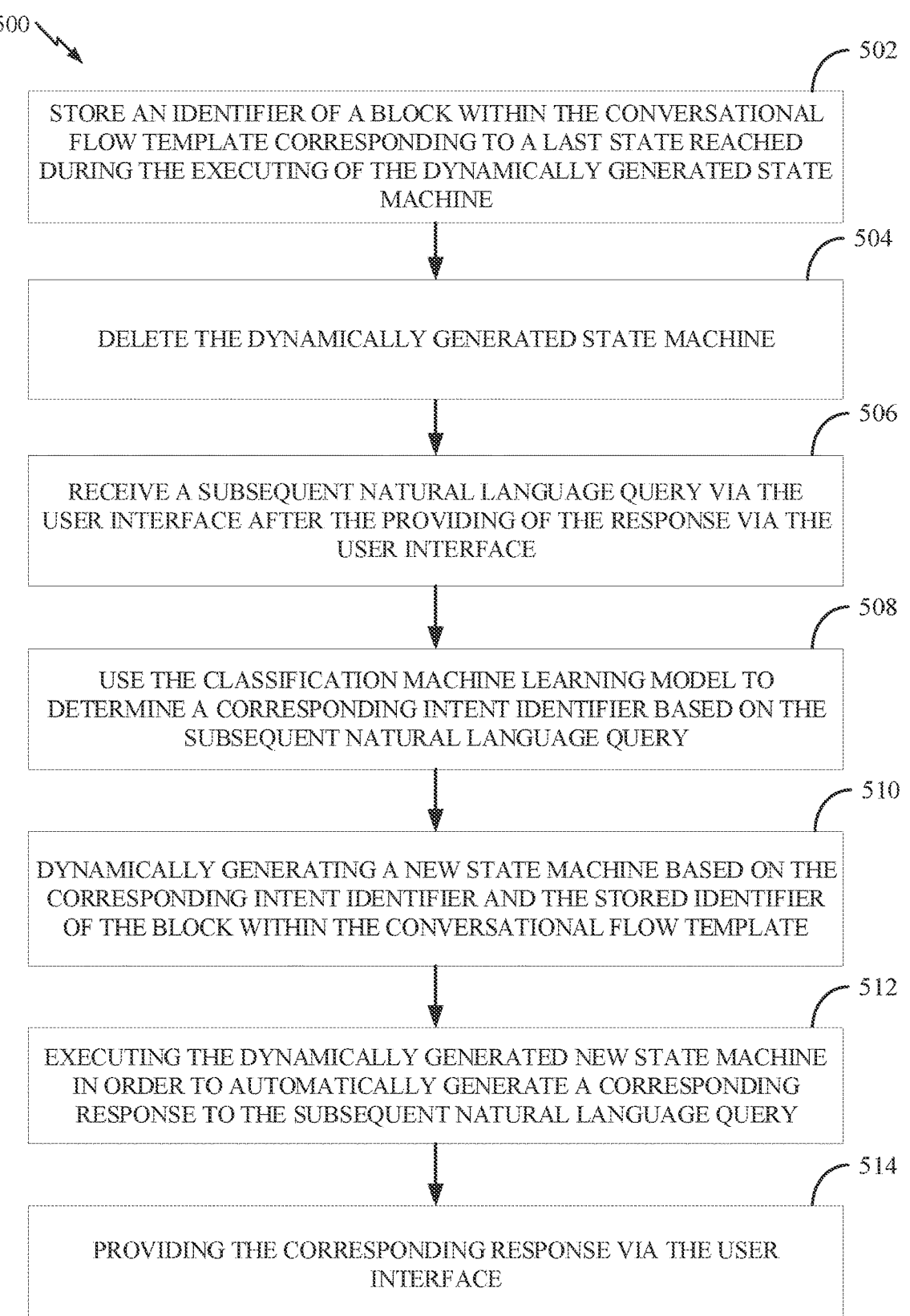

500

502

STORE AN IDENTIFIER OF A BLOCK WITHIN THE CONVERSATIONAL FLOW TEMPLATE CORRESPONDING TO A LAST STATE REACHED DURING THE EXECUTING OF THE DYNAMICALLY GENERATED STATE MACHINE

504

DELETE THE DYNAMICALLY GENERATED STATE MACHINE

506

RECEIVE A SUBSEQUENT NATURAL LANGUAGE QUERY VIA THE USER INTERFACE AFTER THE PROVIDING OF THE RESPONSE VIA THE USER INTERFACE

508

USE THE CLASSIFICATION MACHINE LEARNING MODEL TO DETERMINE A CORRESPONDING INTENT IDENTIFIER BASED ON THE SUBSEQUENT NATURAL LANGUAGE QUERY

510

DYNAMICALLY GENERATING A NEW STATE MACHINE BASED ON THE CORRESPONDING INTENT IDENTIFIER AND THE STORED IDENTIFIER OF THE BLOCK WITHIN THE CONVERSATIONAL FLOW TEMPLATE

512

EXECUTING THE DYNAMICALLY GENERATED NEW STATE MACHINE IN ORDER TO AUTOMATICALLY GENERATE A CORRESPONDING RESPONSE TO THE SUBSEQUENT NATURAL LANGUAGE QUERY

514

PROVIDING THE CORRESPONDING RESPONSE VIA THE USER INTERFACE

FIG. 5

TO NETWORK
610

602

CPU

604

I/O DEVICE(S) /
INTERFACE(S)

606

NETWORK
INTERFACE

612

608

MEMORY

APPLICATION 614

CLASSIFICATION MODEL 616

DYNAMIC STATE MACHINE
GENERATOR 618

STATE MACHINE EXECUTOR 620

USER INTERFACE 622

BUILD ENGINE 624

CONVERSATIONAL FLOW
TEMPLATES 626

STATE MACHINE(S) 628

QUERY DATA 630

CONTEXTUAL DATA 632

RESPONSE DATA 634

CONVERSATIONAL FLOW
DATA 636

MODEL TRAINING DATA 638

SYSTEM 600

UTILIZING DYNAMICALLY GENERATED STATE MACHINES TO EXECUTE CONVERSATIONAL FLOWS IN A SOFTWARE APPLICATION

INTRODUCTION

Aspects of the present disclosure relate to techniques for dynamically generating state machines based on intent identifiers determined from natural language queries in order to automatically generate responses to such natural language queries in a resource-efficient manner.

BACKGROUND

Every year millions of people, businesses, and organizations around the world utilize software applications to assist with countless aspects of life. Many software applications generate automated responses to natural language queries submitted by users, such as in the context of a chatbot or other automated response system.

Existing automated response systems are generally resource-intensive. For example, some existing automated response techniques involve the use of natural language machine learning models such as large language models (LLMs) with large numbers of parameter. However, such techniques generally consume large amounts of physical computing resources, and are often not well-tailored to a particular domain for which automated responses are to be generated in a particular software application. Other existing techniques may involve rules or other logic for determining automated responses to natural language queries. However, these existing techniques are often impractical due to the vast numbers of paths that a natural language conversation could potentially take and the correspondingly large amounts of computing memory and processing resources that would be used to load and execute such logic at runtime. Furthermore, when a software application is used by many users, tracking the states of all such users across a vast array of potential conversation paths within the application can involve a prohibitively large amount of computing resource utilization.

As such, there is a need in the art for improved techniques of automatically generating responses to natural language queries in software applications.

BRIEF SUMMARY

Certain embodiments provide a method for dynamic state machine based conversational flow execution in a software application. The method generally includes: receiving a natural language query via a user interface; using a classification machine learning model to determine an intent identifier based on the natural language query; selecting, based on the intent identifier, a conversational flow template that specifies conversational logic via blocks and edges; dynamically generating a state machine comprising: an initial state corresponding to a point within the selected conversational flow template that is associated with the intent identifier; and one or more additional states and conditions generated based on a subset of the blocks and the edges of the conversational flow template; executing the dynamically generated state machine in order to automatically generate a response to the natural language query; and providing the response via the user interface.

Other embodiments comprise systems configured to perform the method set forth above as well as non-transitory computer-readable storage mediums comprising instructions for performing the method set forth above.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 2 is a diagram illustrating example computing components related to a build stage for dynamic state machine based conversational flow execution in a software application, according to certain embodiments.

FIG. 4 depicts example operations related to dynamic state machine based conversational flow execution in a software application, according to certain embodiments.

FIG. 5 depicts additional example operations related to dynamic state machine based conversational flow execution in a software application, according to certain embodiments.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
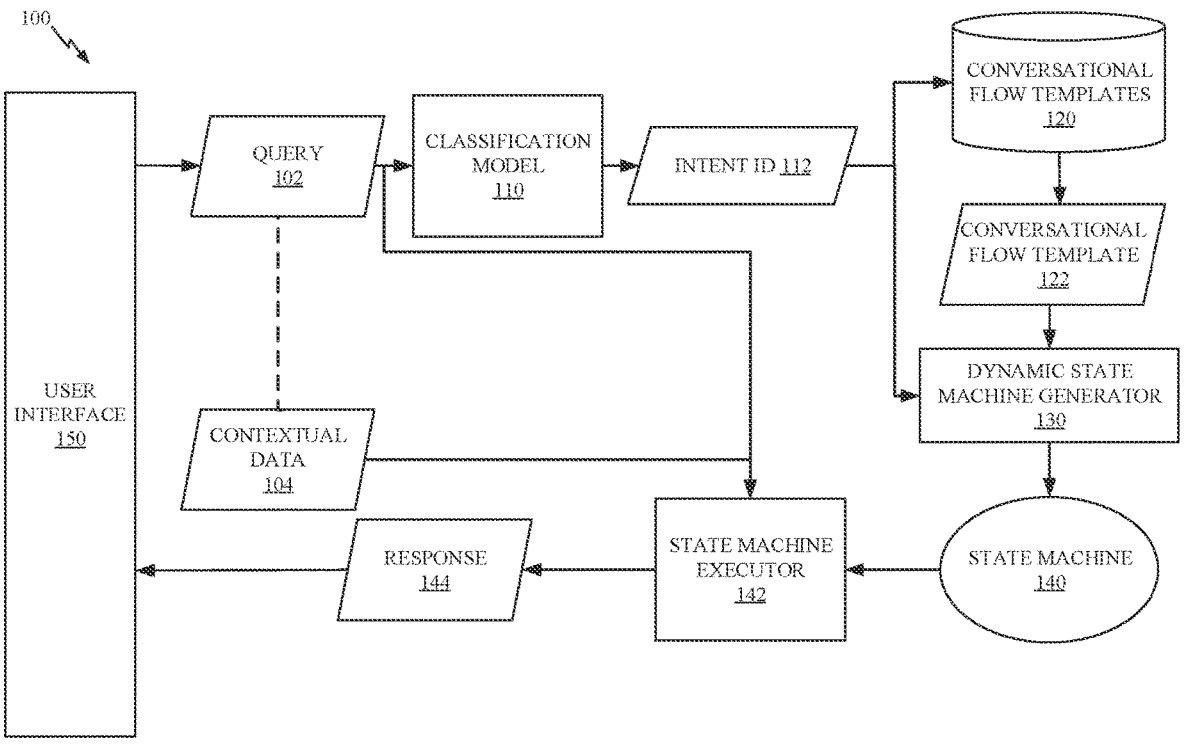
FIG. 1 is a diagram illustrating example computing components related to dynamic state machine based conversational flow execution in a software application, according to certain embodiments.

Aspects of the present disclosure provide apparatuses, methods, processing systems, and computer-readable mediums for dynamic state machine based conversational flow execution in a software application.

Software applications may include rules and/or logic for automatically responding to natural language queries. However, accounting for the vast number of possible paths that a natural language conversation can take via rules and/or logic may result in large amounts of computing resource utilization at run-time in order to load and execute such rules and/or logic. In many cases, loading and/or executing all such rules and/or logic is not necessary in a given context, but it may be difficult to determine the potential scope of conversation paths for the given context. Furthermore, existing techniques do not provide a mechanism for identifying, loading, and executing subsets of rules and/or logic that are potentially applicable to a particular scope of conversation associated with an automated response system.

Embodiments of the present disclosure overcome these challenges by dynamically creating state machines at runtime in response to individual natural language queries for automatically determining responses to the natural language queries. For example, as described in more detail below with respect to FIGS. 1 and 2, conversational flow templates may be defined (e.g., by an application developer, such as via a development user interface) that specify the different paths that a conversation may take in the context of a particular software application, such as a particular chatbot. These conversational flow templates may be graphs that map out potential conversation paths via blocks connected to one another via edges, and may be associated with intent identifiers (e.g., by the application developer). An intent identifier generally refers to an identifier that is associated with a group of natural language utterances that are determined to express an identical or similar intent or purpose (e.g., based on input from the application developer or another entity labeling the utterances with particular intent identifiers).

Conversational flow templates may serve as the basis for dynamically creating state machines at run-time. For example, when a natural language query is received, an intent identifier of the natural language query may be determined and used to identify a particular conversational flow template for use in generating a state machine. The intent identifier of the natural language query may be determined using a classification machine learning model that has been trained based on the natural language utterances associated with each intent identifier, as described in more detail below with respect to FIGS. 1 and 2. Each intent identifier may be mapped to a particular conversational flow template and/or to a particular point within that conversational flow template.

Thus, when the intent identifier of a natural language query (e.g., received from a user) is determined, the applicable conversational flow template may be retrieved using the intent identifier, and an applicable portion of the retrieved conversational flow template may also be determined based on the intent identifier. According to certain embodiments, a state machine is dynamically created based on the applicable portion of the conversational flow template. For example, the blocks and conenctions of the conversational flow template may be used to generate states and conditions (e.g., transitions between states) of the state machine. In some cases, a state machine is generated based on a portion of a conversational flow template starting a point (e.g., node) that is associated with the intent identifier and continuing through the various paths that the conversation could take from that point. In certain embodiments, conversational flow templates may be linked to one another such that one path of a first conversational flow template may link to a different conversational flow template. Thus, a state machine may be created based on multiple conversational flow templates that are linked to one another, such as if the applicable portion of a conversational flow template for a given natural language query includes a path that links to a separate conversational flow template.

After being dynamically created, the state machine may be executed in order to automatically determine a response to the natural language query. For example, the natural language query and associated context information may be used to transition between one or more states in the state machine until the state machine is complete or reaches a point at which additional information is needed to continue execution. Associated context information may include, for example, user attributes, device attributes, application history data, and/or the like. Executing the state machine may involve, for example evaluating one or more conditions (e.g., running logic gates), invoking application programming interface (API) methods (e.g., to read and/or write data, and/or to otherwise perform requested functionality), adding information to a message buffer to be conveyed to the user, and/or performing other operations based on the natural language query and associated context information. When the state machine has been executed to completion or to a state where additional information is needed, then a response to the natural language query generated based on the executing of the state machine may be provided to the user (e.g., via the user interface). For example, the response may include natural language text (e.g., that was added to a message buffer during execution of the state machine) that is responsive to the natural language query, indicates results of performing one or more actions, provides requested information, requests additional information from the user, and/or the like, as described in more detail below with respect to FIG. 3.

The dynamically-created state machine may be deleted after it is used to generate a response to the natural language query. For example, information related to a last state of the state machine may be stored (e.g., the information may include an identifier of a node in a conversational flow template that corresponds to a final state reached during execution of the state machine) and, in some embodiments, other contextual information (e.g., information about the natural language query, the associated context information, data retrieved during execution of the state machine, and/or the like) may also be stored, while the state machine itself may be deleted. Subsequently, a new state machine may be dynamically generated when a subsequent natural language query is received. For example, an intent identifier for the subsequent natural language query may be determined using the classification machine learning model, and the stored final state information and/or contextual information from the previous natural language query may be used in conjunction with the determined intent identifier to determine whether the subsequent natural language query is a continuation of conversation or intent associated with the previous natural language query and/or whether the subsequent natural language query relates to a different or new conversation or intent. If the subsequent natural language query is a continuation of a previous conversation, then a state machine may be dynamically generated based on stored state information for the previous natural language query, such as beginning with a node of a conversational flow template identified by the stored state information. If the subsequent natural language query relates to a different or new conversation or intent, then a state machine may be dynamically generated based on a conversational flow template corresponding to the determined intent identifier of the subsequent natural language query (e.g., which may indicate a different intent than the previous conversation).

Accordingly, a new state machine may be dynamically generated for automatically determining a response to each subsequent natural language query, and may be deleted after generating each subsequent response. Each subsequently generated state machine may be focused on the potential scope of conversation that is associated with the particular corresponding natural language query, and as a result of such dynamically-determined focus, may reduce the amount of computing resource utilization associated with loading and/or executing such a state machine at run-time compared to an alternative approach of loading and/or executing rules and/or logic (e.g., in the form of a state machine) associated with a larger potential scope of conversational paths (e.g., all possible conversational paths for which rules and/or logic have been defined in the application).

Techniques described herein improve the technical field of automated response generation for natural language queries in a number of ways. For instance, by dynamically generating state machines for specific natural language queries, embodiments of the present disclosure enable focused application logic to be loaded and executed at run-time for automatically generating a response to each individual natural language query without loading and/or executing application logic that is not relevant to that individual natural language query. Thus, state machines generated according to techniques described herein utilize fewer computing resources, such as memory and processing resources, than alternative state machines or other logic that would otherwise account for a larger scope of potential conversation paths, such as all possible conversation paths for which such logic has been defined, particularly when many such conversation paths are not relevant to a particular natural language query that is being processed. Furthermore, by deleting each dynamically-generated state machine after it is used to generate a response to a natural language query, techniques described herein avoid the computing resource utilization that would otherwise occur as a result of storing such state machines (e.g., in memory) after execution, and allow subsequent state machines to be generated in a more focused manner for each subsequent natural language query, rather than continuing execution of the same (e.g., larger and/or less focused) state machine across multiple natural language queries.

Additionally, by generating conversational flow templates (e.g., based on conversational flows designed by experts), such as for specific software applications, and associating the conversational flow templates with intent identifiers, techniques described herein enable such conversational flow templates to be used to dynamically generate a state machine at run-time, such as based on an intent identifier determined for a particular natural language query received from a user. Utilizing a classification machine learning model that has been trained based on natural language utterances labeled with intent identifiers to automatically determine an intent identifier for an input natural language query enables such intent identifiers to be accurately and efficiently determined at run-time for use in dynamic state machine generation. Thus, embodiments of the present disclosure enable a computer to do what it could not do before-namely, dynamically generating state machines at run-time in a focused manner based on a scope of conversational paths relevant to a particular natural language query so that such state machines can be efficiently executed to automatically determine a response to the particular natural language query.

While some existing techniques involve the use of a knowledge engine to map out logic and/or information to be utilized during execution of a software application, such knowledge engines in conventional techniques are generally static in nature, and not focused on a particular context. By contrast, techniques described herein involve the use of dynamic state machines that are generated at run-time, are not static, can adapt to different contexts in a focused manner, utilize fewer computing resources than knowledge engines as a result of being dynamically generated and focused on particular contexts, and can start at dynamically selected locations in order to more efficiently generate responses to natural language queries.

Example Computing Components Related to Dynamic State Machine Based Conversational Flow Execution FIG. 1 is a diagram 100 illustrating example computing components related to dynamic state machine based conversational flow execution in a software application, according to certain embodiments.

In diagram 100, a query 102 received via a user interface 150 is provided to a classification model 110. User interface 150 generally represents a user interface associated with a software application, such as displaying a chatbot interface by which a user of the software application may provide natural language queries and receive automatically generated natural language responses. An example of such a user interface 150 is described below with respect to FIG. 3. Query 102 generally represents a natural language query, such as input by a user via user interface 150 (e.g., in a chatbot interface).

Classification model 110 generally represents a machine learning model that has been trained to output an intent identifier (e.g., intent identifier 112) in response to an input natural language query. Classification model 110 may, for example, be a neural network, a tree-based classifier, a Naïve Bayes classification model, a logistic regression model, and/or the like.

Neural networks, for example, generally include a collection of connected units or nodes called artificial neurons. The operation of neural networks can be modeled as an iterative process. Each node has a particular value associated with it. In each iteration, each node updates its value based upon the values of the other nodes, the update operation typically consisting of a matrix-vector multiplication. The update algorithm reflects the influences on each node of the other nodes in the network. In some cases, a neural network comprises one or more aggregation layers, such as a softmax layer.

A tree-based model (e.g., a decision tree) makes a classification by dividing the inputs into smaller classifications (at nodes), which result in an ultimate classification at a leaf. Boosting, or gradient boosting, is a method for optimizing tree models. Boosting involves building a model of trees in a stage-wise fashion, optimizing an arbitrary differentiable loss function. In particular, boosting combines weak "learners" into a single strong learner in an iterative fashion. A weak learner generally refers to a classifier that chooses a threshold for one feature and splits the data on that threshold, is trained on that specific feature, and generally is only slightly correlated with the true classification (e.g., being at least more accurate than random guessing). A strong learner is a classifier that is arbitrarily well-correlated with the true classification, which may be achieved through a process that combines multiple weak learners in a manner that optimizes an arbitrary differentiable loss function. The process for generating a strong learner may involve a majority vote of weak learners. In one example, classification model 110 is a gradient boosted tree model. Examples of gradient boosted tree models include XGBoost and LightGBM. In another example, classification model 110 is a random forest model. A random forest extends the concept of a decision tree model, except the nodes included in any given decision tree within the forest are selected with some randomness. Thus, random forests may reduce bias and group outcomes based upon the most likely positive responses.

A Naïve Bayes classification model is based on the concept of dependent probability i.e., what is the chance of some outcome given some other outcome.

A logistic regression model takes some inputs and calculates the probability of some outcome, and the label may be applied based on a threshold for the probability of the outcome. For example, if the probability is >50% then the label is A, and if the probability is <=50%, then the label is B.

Classification model 110 may, for example, have been trained through a supervised learning process based on natural language strings associated with labels indicating intent identifiers, as described in more detail below with respect to FIG. 2.

Classification model 110 outputs an intent identifier 112 based on query 102. For example, intent identifier 112 may be a unique identifier (e.g., numerical or otherwise) that indicates an intent of query 102, and that is also associated with a conversational flow template 122 of a plurality of conversational flow templates 120. In some embodiments, classification model 110 may output multiple intent identifiers associated with confidence scores, and intent identifier 112 has a highest confidence score of the intent identifiers that are output by classification model 110. In some cases, if no intent identifier with a confidence score above a threshold is output by classification model 110, then a default intent identifier may be selected.

In certain embodiments, conversational flow templates 120 include a plurality of individual conversational flow templates that are associated with intent identifiers. Each conversational flow template may be constructed in the form of a graph including blocks that represent potential turns of conversation and that are connected to one another via particular edges. For example, conversational flow templates 120 may be application-specific templates defined in a domain specific language (DSL) based on conversational flows that were designed by an expert (e.g., through interaction with a user interface, such as a drag and drop interface). Each respective conversational flow template 120 may be based on one or more subsets of one or more such conversational flows, as described in more detail below with respect to FIG. 2, and may be defined for one or more particular software applications (e.g., an application associated with user interface 150). In one example, a given block of conversational flow template 122 indicates one or more steps to be performed when one or more conditions are met, such as an API call that is to be made when a particular type of information is requested or is otherwise relevant to generating an answer to a particular natural language query. The given block may be connected to one or more additional blocks, such as via edges that are to be traversed when one or more certain conditions are present, such as conditions that are based on results of performing the one or more steps indicated in the given block and/or based on other information (e.g., the natural language query and/or associated context data). In a particular example, a block of conversational flow template 122 indicates that a particular API call is to be made in order to retrieve a user's account balance, such as if the user's account balance was requested in a natural language query or is otherwise relevant to determining an answer to the natural language query (e.g., if the user asked whether a certain expense can be afforded). In another example, a block indicates that a particular natural language response (e.g., "Hello, how can I help you today?") is to be provided if a particular natural language query or type of natural language query is received (e.g., "Hello" or another greeting).

Conversational flow template 122 may be constructed based on knowledge of the particular software application to which it relates, such as including references to particular logic (e.g., functions) associated with the particular software application. By contrast, the conversational flows upon which conversational flow template 122 is based may be generic, such as not including references to particular application logic.

Each conversational flow template 120 may be mapped at a global level (e.g., across all conversational flow templates 120) to a single unique intent identifier, such that a given intent identifier will be mapped at a global level to only one conversational flow template 120. However, conversational flow templates 120 may also include local intent identifiers, such as mapped to individual blocks within the templates, and these local intent identifiers may not be globally unique. For example, one local intent identifier may be mapped to one or more blocks in a first conversational flow template 120 and to one or more blocks in a second conversational flow template 120. Global intent identifiers and local intent identifiers may overlap with one another, such that an intent identifier that is used to globally identify one conversational flow template 120 may also locally identify a block within the conversational flow template 120 or a block within a different conversational flow template 120. Furthermore, each given block within a given conversational glow template 120 may be associated with one or more intent identifiers (e.g., local intent identifiers).

Intent identifier 112 may be used to select conversational flow template 122 from conversational flow templates 120, such as based on determining that intent identifier 112 is the global intent identifier for conversational flow template 122. Conversational flow template 122 may then be used by dynamic state generator 130 to dynamically generate a state machine 140.

Dynamic state machine generator 130 generally represents a component that creates state machines at run-time for use in automatically generating responses to particular natural language queries. In an example, dynamic state machine generator 130 selects all or part of conversational flow template 122 (and, in some embodiments, one or more parts of one or more additional conversational flow templates 120 that may be linked to by relevant portions of conversational flow template 122) based on intent identifier 112 (and, in some embodiments, based on query 102 and/or contextual data 104) for use in generating state machine 140. For instance, if intent identifier 112 is the global intent identifier of conversational flow template 122 and is also mapped (e.g., locally) to a particular block within conversational flow template 122 (e.g., the first block or a different block), dynamic state machine generator 130 may use that particular block as the starting point for state machine 140, and may consider any blocks that can be reached from that particular block as relevant for generating state machine 140.

Dynamic state machine generator 130 may generate state machine 140 by defining states based on the relevant blocks in conversational flow template 122 (and any other relevant blocks from any additional conversational flow templates) and transitions between states that are based on the conditions (e.g., edges) associated with such blocks and/or the results of performing steps indicated in such blocks. In some cases, each of a plurality of nodes in state machine 140 corresponds to a block of conversational flow template 122 and each of a plurality of edges connecting such nodes in state machine 140 corresponds to a particular edge from conversational flow template 122. For instance, a node of state machine 140 may indicate that a certain API call is to be made, certain text is to be added to a message buffer, a certain change is to be made to data stored by an application, certain information is to be retrieved from a particular source, and/or the like. An edge of state machine 140 may indicate one or more conditions that are to be evaluated (e.g., logic gates that are based on results of performing steps indicated in a block and/or based on other information such as the natural language query and/or associated context data), such as to determine whether to proceed to a particular subsequent block. State transitions may occur as a result of traversing through the nodes and edges of state machine 140.

State machine executor 142 may execute state machine 140, such as based on query 102 and/or contextual data 104. Contextual data 104 may include, for example, user attributes (e.g., a user's account type, length of use of the application, preferences, occupation, and/or the like), device attributes (e.g., a device type such as mobile phone, tablet, laptop dektop, and/or the like, operating system type and/or version, device capabilities such as whether the device is associated with a camera, microphone, speakers, and/or the like, and others), application history data (e.g., clickstream data, information about past queries and/or conversations, application configuration information, information about errors detected in relation to the application, and/or the like), and/or other information that is related to query 102. For example, state machine executor 142 may load and execute state machine 140 by performing one or more steps indicated in a first node of state machine 140, evaluating one or more conditions associated with an edge connected to the first node to determine whether to proceed to a subsequent node, and/or the like, such as based on query 102 and/or contextual data 104. State machine executor 142 may execute state machine 140 until a final node is reached (e.g., a node with no outgoing edges) or until additional information is needed from the user in order to transition to another state (e.g., if such additional information is needed to perform one or more steps in a node or to evaluate one or more conditions associated with an edge).

A response 144 is automatically generated based on state machine executor 142 executing state machine 140. For example, response 144 may be a natural language response to query 102, such as including text that was added to a message buffer during execution of state machine 140 by state machine executor 142. Response 144 may include a response to a question or statement by the user, may indicate results of performing one or more steps during execution of state machine 140, may include a request for additional information (e.g., that is needed to perform one or more steps and/or evaluate one or more conditions indicated in state machine 140), and/or the like.

Response 144 may be displayed via user interface 150, such as in a chatbot interface as described below with respect to FIG. 3. For example, if query 102 input by the user (e.g., to a chatbot associated with a financial institution) included the text "What is my account balance?" then response 144 may include the text "I would be happy to help you with that. Are you inquiring about your savings account or your checking account?" For instance, executing a first node of state machine 140 may have involved retrieving account balances from all of the user's accounts (e.g., based on contextual data 104, such as the user's account number(s), confirmation that user has validly logged in, and/or the like) and two different edges connected to the first node may have been associated with conditions related, respectively, to whether the user was inquiring about a savings account or a checking account. In order to evaluate the conditions associated with these edges, additional information may be needed from the user, such as an indication of which account the user is inquiring about.

After generating response 144, information related to a final state of state machine 140 that was reached during execution by state machine executor 142 may be stored. For example, an identifier of the block in conversational flow template 122 corresponding to the last node reached in state machine 140 may be stored, as well as an identifier of conversational flow template 122 itself (e.g., the global intent identifier of conversational flow template 122). Furthermore, data determined during execution of state machine 140 may be stored, such as data retrieved via API calls, results of computations or other determinations, ad/or the like. In some cases, query 102, intent identifier 112, contextual data 104, and/or response 144 may also be stored. Data that is stored after executing a state machine may be stored, for example, in a database, from which it may be retrieved when a subsequent natural language query is received. In some embodiments, certain data (e.g., data retrieved via API calls and/or otherwise determined during state machine execution) may be persisted for a certain amount of time (e.g., which may be a configurable parameter), after which such data may be deleted. State machine 140, however, may be deleted after response 144 is generated. For example, a new state machine may be dynamically generated for each subsequent natural language query, and so state machine 140 may be deleted after it has been executed.

For example, if the user's account balances were retrieved during execution of state machine 140, those balances may be stored along with query 102, intent identifier 112, contextual data 104, and/or response 144, while state machine 140 may be deleted.

If a subsequent natural language query is received, classification model 110 may be used to determine an intent identifier of the subsequent natural language query. A determination may be made as to whether the subsequent natural language query is a continuation of the previous conversation (e.g., associated with query 102), such as based on comparing the subsequent query and/or its determined intent identifier to the stored information about the previous query, such as query 102, intent identifier 112, contextual data 104, any data stored from execution of state machine 140, and/or the like. If the subsequent query is determined to be a continuation of the previous conversation, then a new state machine may be dynamically generated based on (e.g., starting from) the block in conversational flow template 122 corresponding to the last node reached during execution of state machine 140 when evaluating the previous query 102. The determined intent identifier of the subsequent natural language query may be used to determine whether there is a particular block within the relevant scope of conversational flow template 122 that is locally associated with that determined intent identifier, and such an association may also be used in dynamically generating the state machine for the subsequent query.

However, if the subsequent query is determined not to be a continuation of the previous conversation, then a new state machine may be dynamically generated based on a newly selected conversational flow template, such as the conversational flow template that is globally identified by the determined intent identifier of the subsequent natural language query.

The state machine for the subsequent natural language query may then be executed in a similar manner to that described above. For example, if the subsequent query indicates that the user is inquiring about a checking account, then the state machine may begin at a point at which execution of state machine 140 left off (e.g., evaluating one or more conditions related to which account the user inquiring about), and may be evaluated based on the subsequent query, its associated context data, and/or the stored information from the previous query (e.g., including the stored account balances). Thus, the state machine may be executed in order to generate a response including the text "The balance of your checking account is $575."

FIG. 2 is a diagram 200 illustrating example computing components related to a build stage for dynamic state machine based conversational flow execution in a software application, according to certain embodiments. Diagram 200 includes classification model 110 and conversational flow templates 120 of FIG. 1.

One or more conversational flows 202, associated with one or more intent identifiers 204, which are also associated with one or more natural language strings 206, may be provided to a build engine 210.

Build engine 210 generally represents one or more components that perform functionality related to generating conversational flow templates 120 and/or classification model 110, such as for one or more particular software applications based on input from one or more application developers.

Conversational flows 202 generally represent logical representations of conversational paths related to particular topics. For example, experts (e.g., conversation designers) may define conversational flows 202, such as by providing input (e.g., drag and drop) via a conversation design user interface. Each conversational flow 202 may represent the various paths that a conversation related to a particular subject could take, such as including topics, conditions, and/or actions that may be related to such conversation paths. Conversational flows 202 may be associated with intent identifiers 204, such as by experts. For example, each conversational flow 202 and/or one or more nodes within each conversational flow 202 may be associated with one or more intent identifiers 204. Each intent identifier 204 may be associated with a plurality of natural language strings 206, such as by experts. For example, natural language strings 206 may be natural language utterances that have been grouped and/or otherwise labeled with particular intent identifiers 204.

An application developer may create one or more conversational flow templates 120, such as via input to build engine 210, based on one or more conversational flows 202 and associated intent identifiers 204. A given conversational flow template 120 may be generated in a DSL that includes blocks that are based on nodes of conversational flows 202 and connections (e.g., edges) that are based on the connections (e.g., edges) in conversational flows 202. While nodes in conversational flows 202 may be genericized, such as not including references to logic of particular software applications, corresponding blocks of conversational flow templates 120 may reference logic of particular software applications, such as particular APIs and/or other types of functionality. A given conversational flow template 120 may be based on one or more portions of one or more conversational flows 202. For example, an application developer may select particular portions of particular conversational flows 202 to include in a given conversational flow template 120 for a particular software application, and may provide indications of particular application logic that implements operations that are described more generically in the particular conversational flows 202. Furthermore, intent identifiers 204 that are associated with applicable portions of applicable conversational flows 202 may also be associated with conversational flow templates 120. In some embodiments, an application developer may specify which intent identifiers are to be used as global identifiers for particular conversational flow templates 120 and which intent identifiers are to be locally associated with particular blocks of conversational flow templates 120. In certain embodiments, previously-existing associations between applicable portions of conversational flows 202 and intent identifiers 204 may be automatically carried over into conversational flow templates 120.

Classification model 110 is also trained, such as by build engine 210 or another component, based on the associations between natural language strings 206 and intent identifiers 204. For example, classification model 110 may be trained in a global manner (e.g., for use across multiple software applications) or in an application specific manner.

Training of classification model 110 may be a supervised learning process. Supervised learning generally involves providing training inputs (e.g., natural language strings 206) as inputs to classification model 110. Classification model 110 processes the training inputs and produces outputs (e.g., indicating intent identifiers) based on the training inputs. The outputs are compared to the labels associated with the training inputs (e.g., intent identifiers 204 associated with the natural language strings 206) to determine the accuracy of the model, and parameters of classification model 110 are iteratively adjusted until one or more conditions are met. For instance, the one or more conditions may relate to an objective function (e.g., a cost function or loss function) for optimizing one or more variables (e.g., relating to model accuracy). In some embodiments, the conditions may relate to whether the predictions produced by the model based on the training inputs match the labels associated with the training inputs or whether a measure of error between training iterations is not decreasing or not decreasing more than a threshold amount. The conditions may also include whether a training iteration limit has been reached. Parameters adjusted during training may include, for example, hyperparameters, values related to numbers of iterations, weights, functions used by nodes to calculate scores, and the like. In some embodiments, validation and testing are also performed for classification model 110, such as based on validation data and test data, as is known in the art.

In some embodiments, classification model 110 may be re-trained over time based on user feedback. For example, if user feedback indicates that a response generated based on an intent identifier output by classification model 110 for a natural language query is inaccurate or irrelevant or that such a response is accurate or relevant, then such user feedback may be used as ground truth data indicating that the intent identifier is or is not correctly associated with the natural language query. Such ground truth data may be used to generate updated training data that may then be used to re-train classification model 110 through a supervised learning process as described above, such as to improve the accuracy of classification model 110 and reduce false positives through an interactive feedback loop.

Figure 3:
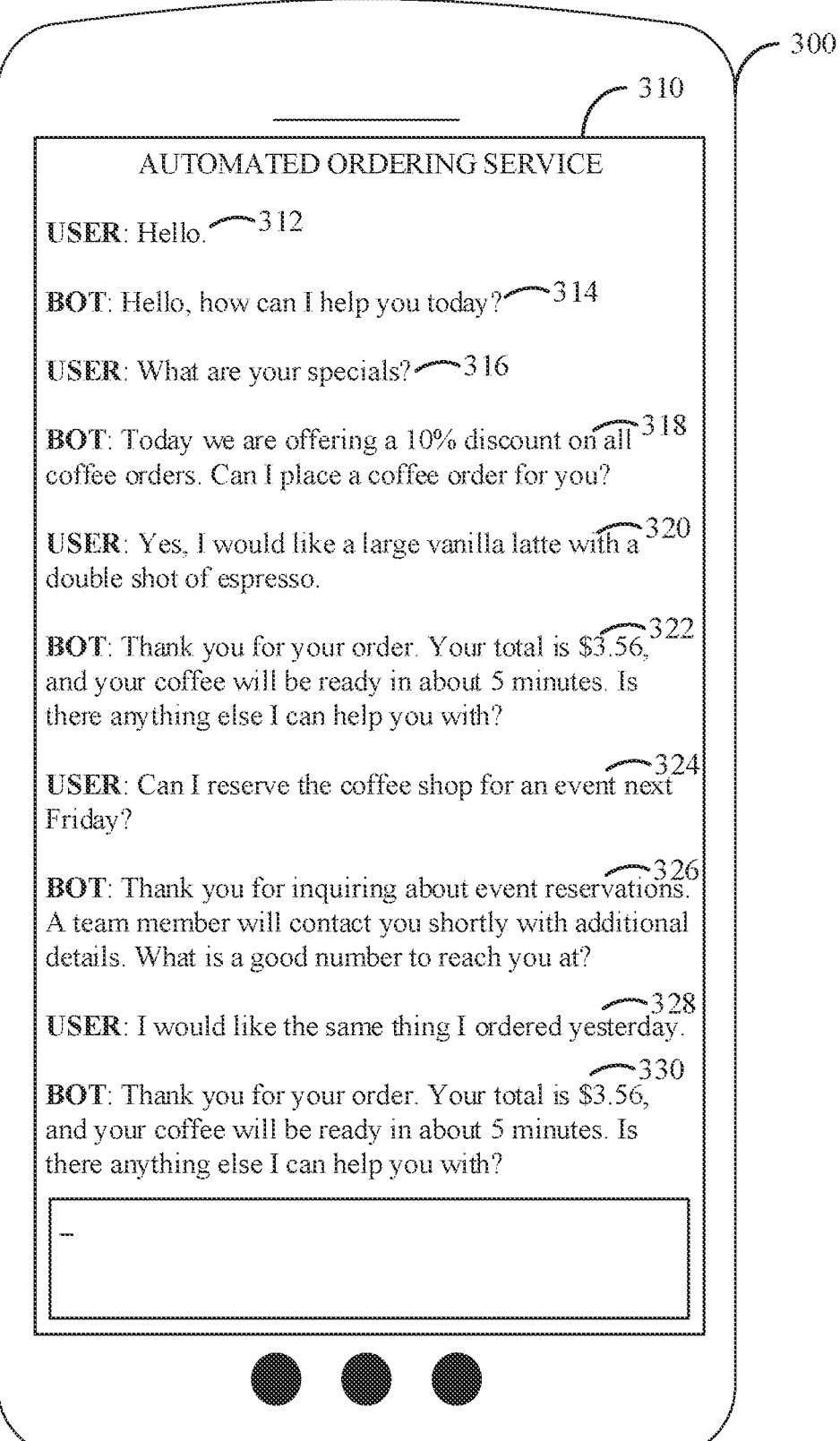
FIG. 3 depicts an example user interface screen related to dynamic state machine based conversational flow execution in a software application, according to certain embodiments.

Example User Interface Screen Related to Dynamic State Machine Based Conversational Flow Execution FIG. 3 depicts an example user interface screen 310 on a computing device 300 related to dynamic state machine based conversational flow execution in a software application, according to certain embodiments. For example, user interface screen 310 may be an example screen of user interface 150 of FIG. 1.

Device 300 may be representative of a computing device such as system 600 of FIG. 6 (described below) on which one or more software applications may be executed. In some embodiments, aspects of functionality described herein may be performed on device 300, while other aspects of functionality described herein may be performed on one or more separate computing devices, such as one or more servers connected to system 600 via a network (e.g., the Internet or another connection over which data may be transmitted). In one example, device 300 is a mobile device such as a smartphone.

User interface screen 310 includes natural language queries and natural language responses associated with an automated response system, such as a chatbot. In the depicted, example, user interface screen 310 relates to an automated ordering service for a business such as a restaurant. For example, a chatbot application may have been developed to implement an ordering service for a coffee shop, and one or more conversational flow templates (e.g., such as conversational flow templates 120 of FIGS. 1 and 2) may have been generated for the chatbot application based on one or more conversational flows (e.g., such as conversational flows 202 of FIG. 2) generated by a conversation designer familiar with the subject matter.

First, the user provides a query 312 including the text "Hello." Query 312 may be provided to classification model 110 of FIGS. 1 and 2 in order to determine an intent identifier of query 312. The intent identifier may then be mapped to a conversational flow template (e.g., that is globally associated with the intent identifier) and, in some embodiments, a block within the conversational flow template. All or part of the conversational flow template may then be used to dynamically generate a state machine (e.g., similar to state machine 140 of FIG. 1) as described above. For example, the intent identifier of query 312 may be associated with a first block of a conversational flow template representing introductory logic of the conversational flow template (e.g., introductions, initial information gathering, and/or the like).

The dynamically generated state machine may be executed in order to automatically generate a response 314 to query 312. For example, the state machine may be executed until additional information is needed from the user (e.g., what sort of order to user would like to place), and response 314 may include a request for such additional information, such as including the text "Hello, how can I help you today?"

Information related to the final state of the state machine reached during execution, information retrieved or otherwise determined during execution of the state machine, the query 312, associated contextual information, and/or the like may be stored, while the state machine itself may be deleted after response 314 is generated.

The user may then provide a subsequent query 316, asking "What are your specials?" An intent identifier of query 316 may be determined using classification model 110 of FIGS. 1 and 2, and a determination may be made that query 316 is a continuation of the previous conversation, such as based on the intent identifier of query 316 matching an intent identifier associated with a block of a conversational flow template corresponding to a last state reached during execution of the previous state machine and/or based on other comparisons related to stored information from the processing the previous query and the present query and its associated context information. As such, a new state machine may be dynamically generated starting at the block of the conversational flow template corresponding to the last state reached during execution of the previous state machine, such as including conversational paths that can be taken from that block. The state machine may be executed until additional input is needed from the user (e.g., information about the day's specials may be retrieved using one or more API calls, and then additional information about whether the user would like to place an order may be needed before any additional states can be reached), and response 318 may be generated based on the executing. Response 318 includes the text "Today we are offering a 10% discount on all coffee orders. Can I place a coffee order for you?" As before, certain information related to executing the state machine may be stored, while the state machine itself may be deleted after generating response 318.

A subsequent query 320 is received from the user, including the text "Yes, I would like a large vanilla latte with a double shot of espresso." Query 320 may be processed in a similar manner to that described above with respect to query 316 to determine that query 320 is a continuation of the previous conversation, and so a state machine may be dynamically generated based on the block of the applicable conversational flow template corresponding to the last state reached during execution of the previous query. The state machine may be executed to determine the response 322, which includes the text "Thank you for your order. Your total is $3.56, and your coffee will be ready in about 5 minutes. Is there anything else I can help you with?" For example, executing the state machine may involve calling an API function that enters a new order into the system, and response 322 may include results of that operation, information about the order that was placed, and a request for additional information. Again, certain information may be stored while the state machine may be deleted after generating response 322.

A subsequent query 324 is received from the user, including the text "Can I reserve the coffee shop for an event next Friday?" A determination may be made based on an intent identifier determined for query 324 (using the classification model) and/or other context data, such as when compared to stored information about the previous conversation, that query 324 is not a continuation of the previous conversation, and in fact relates to a different conversational flow template. Thus, a state machine may be dynamically generated based on the different conversational flow template (e.g., starting from a particular block of the different conversational template associated with the intent identifier), and may be executed to determine response 326. Response 326 includes the text "Thank you for inquiring about event reservations. A team member will contact you shortly with additional details. What is a good number to reach you at?" Again, certain information may be stored while the state machine may be deleted after generating response 326.

A subsequent query 328 is received from the user, including the text "I would like the same thing I ordered yesterday." For example, the user may have determined not to inquire further about event reservations, and may have waited until the next day to send query 328. A determination may be made based on an intent identifier determined for query 328 (using the classification model) and/or other context data, such as when compared to stored information about the previous conversation, that query 328 is not a continuation of the previous conversation associated with query 324, and in fact relates to an earlier conversation (e.g., the conversation related to queries 312, 316, and 320). Thus a state machine may be dynamically generated based on the block of the applicable conversational flow template that corresponds to the last state reached during execution of the state machine that was previously generated for processing query 320. The state machine may be executed to determine response 330, which includes the text "Thank you for your order. Your total is $3.56, and your coffee will be ready in about 5 minutes. Is there anything else I can help you with?"

Thus, techniques described herein allow state machines to be dynamically created based on an applicable scope of potential conversational paths related to each individual query in a manner that maintains contextual awareness of previous conversations for efficient and targeted loading and execution of application logic for automatically generating responses to natural language queries.

It is noted that the queries, responses, and operations described with respect to user interface screen 310 are included as examples, and many other examples are possible with techniques described herein.

Examples Operations for Dynamic State Machine Based Conversational Flow Execution FIG. 4 depicts example operations 400 related to dynamic state machine based conversational flow execution in a software application, according to certain embodiments. For example, illustration 400 may be performed by one or more components described above with respect to FIG. 1, system 600 of FIG. 6 (described below), and/or one or more other components and/or devices.

Operations 400 begin at step 402, with receiving a natural language query via a user interface.

Operations 400 continue at step 404, with using a classification machine learning model to determine an intent identifier based on the natural language query. In some embodiments, the using of the classification machine learning model to determine the intent identifier based on the natural language query comprises: providing one or more inputs to the classification machine learning model based on the natural language query; and receiving the intent identifier as an output from the classification machine learning model in response to the one or more inputs, wherein the classification machine learning model has been trained through a supervised learning process based on training data comprising natural language strings associated with labels indicating intent identifiers.

Operations 400 continue at step 406, with selecting, based on the intent identifier, a conversational flow template that specifies conversational logic via blocks and edges. In some embodiments, the selecting, based on the intent identifier, the conversational flow template comprises selecting the conversational flow template from a plurality of conversational flow templates that are associated with intent identifiers.

Operations 400 continue at step 408, with dynamically generating a state machine comprising: an initial state corresponding to a point within the selected conversational flow template that is associated with the intent identifier; and one or more additional states and conditions generated based on a subset of the blocks and the edges of the conversational flow template.

Operations 400 continue at step 410, with executing the dynamically generated state machine in order to automatically generate a response to the natural language query. In some embodiments, the executing of the dynamically generated state machine comprises transitioning through states of the dynamically generated state machine until the state machine is complete or additional user input is needed. In certain embodiments, the executing of the dynamically generated state machine comprises transitioning through the states of the dynamically generated state machine until the additional user input is needed, and the response comprises a request for the additional user input. In some embodiments, the executing of the dynamically generated state machine comprises invoking one or more application programming interface (API) functions.

Operations 400 continue at step 412, with providing the response via the user interface.

Some embodiments further comprise determining one or more contextual data items related to the natural language query, wherein the executing of the dynamically generated state machine is based on the one or more contextual data items. For example, the one or more contextual data items may comprise one or more of: a user attribute; a device attribute; or application history data.

Notably, method 400 is just one example with a selection of example steps, but additional methods with more, fewer, and/or different steps are possible based on the disclosure herein.

FIG. 5 depicts additional example operations 500 related to dynamic state machine based conversational flow execution in a software application, according to certain embodiments. For example, illustration 500 may be performed by one or more components described above with respect to FIG. 1, system 600 of FIG. 6 (described below), and/or one or more other components and/or devices. In some embodiments, operations 500 may be performed after operations 400 of FIG. 4.

Operations 500 begin at step 502, with storing an identifier of a block within the conversational flow template corresponding to a last state reached during the executing of the dynamically generated state machine.

Operations 500 continue at step 504, with deleting the dynamically generated state machine.

Operations 500 continue at step 506, with receiving a subsequent natural language query via the user interface after the providing of the response via the user interface.

Operations 500 continue at step 508, with using the classification machine learning model to determine a corresponding intent identifier based on the subsequent natural language query.

Operations 500 continue at step 510, with dynamically generating a new state machine based on the corresponding intent identifier and the stored identifier of the block within the conversational flow template. In some embodiments, the dynamically generating of the new state machine comprises determining, based on the corresponding intent identifier and the stored identifier of the block within the conversational flow template, whether to use the conversational flow template or a different conversational flow template to dynamically generate the new state machine.

Operations 500 continue at step 512, with executing the dynamically generated new state machine in order to automatically generate a corresponding response to the subsequent natural language query.

Operations 500 continue at step 514, with providing the corresponding response via the user interface.

Notably, method 500 is just one example with a selection of example steps, but additional methods with more, fewer, and/or different steps are possible based on the disclosure herein.

Example Computing System

Figure 6:
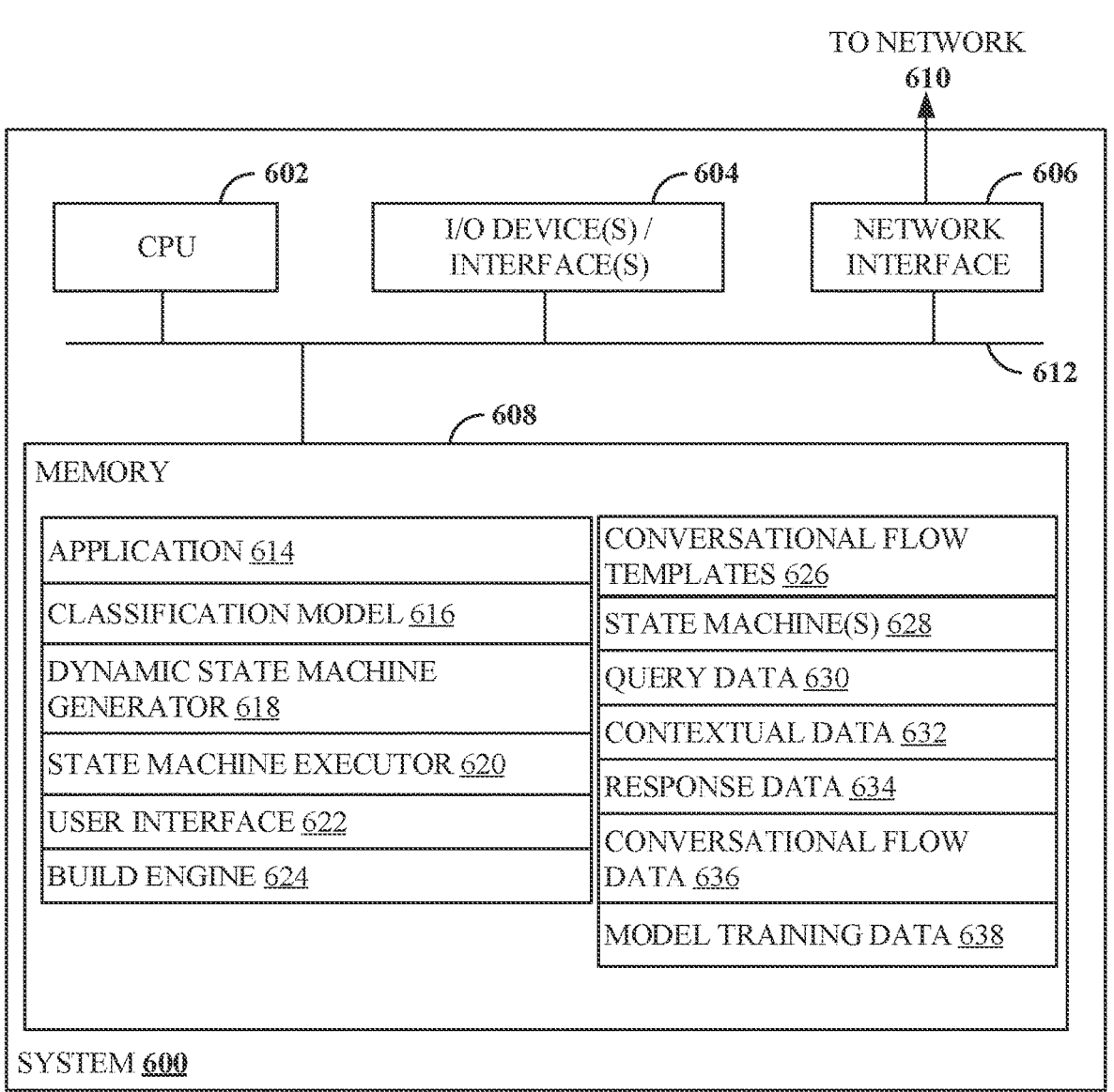
FIG. 6 depicts an example processing system for dynamic state machine based conversational flow execution in a software application, according to certain embodiments.

FIG. 6 illustrates an example computing system 600 with which embodiments of the disclosure related to dynamic state machine based conversational flow execution may be implemented. For example, the computing system 600 may be representative of device 300 of FIG. 3, may perform functionality described above with respect to FIGS. 1 and 2, and/or may perform operations 400 of FIG. 4 and/or operations 500 of FIG. 5.

The computing system 600 includes a central processing unit (CPU) 602, one or more I/O device interfaces 604 that may allow for the connection of various I/O devices 604 (e.g., keyboards, displays, mouse devices, pen input, etc.) to the computing system 600, a network interface 606, a memory 608, and an interconnect 612. It is contemplated that one or more components of the computing system 600 may be located remotely and accessed via a network 610. It is further contemplated that one or more components of the computing system 600 may include physical components or virtualized components.

The CPU 602 may retrieve and execute programming instructions stored in the memory 608. Similarly, the CPU 602 may retrieve and store application data residing in the memory 608. The interconnect 612 transmits programming instructions and application data, among the CPU 602, the I/O device interface 604, the network interface 606, the memory 608. The CPU 602 is included to be representative of a single CPU, multiple CPUs, a single CPU having multiple processing cores, and other arrangements.

Additionally, the memory 608 is included to be representative of a random access memory or the like. In some embodiments, the memory 608 may include a disk drive, solid state drive, or a collection of storage devices distributed across multiple storage systems. Although shown as a single unit, the memory 608 may be a combination of fixed and/or removable storage devices, such as fixed disc drives, removable memory cards or optical storage, network attached storage (NAS), or a storage area-network (SAN).

As shown, the memory 608 includes application 614, which may be representative of a software application that provides functionality described herein related to automated response generation, such as a chatbot application. Memory 608 further includes classification model 616, dynamic state machine generator 618, state machine executor 620, and user interface 622, which are generally representative of classification model 110, dynamic state machine generator 130, state machine executor 142, and user interface 150 of FIG. 1. Memory 608 further includes build engine 624, which is generally representative of build engine 210 of FIG. 2, and conversational flow templates 626, which are generally representative of conversational flow templates 120 of FIG. 1. Memory 608 further includes state machine(s) 628, which may include state machine 140 of FIG. 1.

Memory 608 further includes query data 630, which may include query 102 of FIG. 1 and queries 312, 316, 320, 324, and 328 of FIG. 3. Memory 608 further includes contextual data 634, which may include contextual data 104 of FIG. 1. Memory 608 further includes response data 634, which may include response 144 of FIG. 1 and responses 314, 318, 322, 326, and 330 of FIG. 3. Memory 608 further includes conversational flow data 636, which generally includes conversational flows 202 and associated information such as intent identifiers 204 and/or natural language strings 206 of FIG. 2. Memory 608 further includes model training data 638, which may include natural language strings 206 labeled with intent identifiers 204 of FIG. 2. While not shown, memory 608 may also include a database that stores information related to execution of state machine(s) 628, such as conversational flow template identifiers, block identifiers within conversational flow templates, queries and associated context data, data retrieved and/or otherwise determined during execution of state machine(s) 628, and/or the like.

It is noted that system 600 is included as an example, and certain functionality described with respect to system 600 and/or otherwise described herein may be implemented via more or fewer devices and/or components.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for dynamic state machine based conversational flow execution in a software application, comprising:
  receiving a natural language query via a user interface;
  determining an intent identifier based on the natural language query using a classification machine learning model trained through a supervised learning process comprising:
    providing one or more training natural language strings to the classification machine learning model;
    receiving one or more output intent identifiers produced by the classification machine learning model based on the training natural language strings; and
    iteratively modifying parameters of the classification machine learning model based on comparing the output intent identifiers to labels associated with the training natural language strings;
  selecting, based on the intent identifier, a conversational flow template that specifies conversational logic via blocks and edges;

dynamically generating a state machine comprising:

an initial state corresponding to a point within the selected conversational flow template that is associated with the intent identifier; and one or more additional states and conditions generated based on a subset of the blocks and the edges of the conversational flow template;

executing the dynamically generated state machine in order to automatically generate a response to the natural language query;

providing the response via the user interface;

storing an identifier of a block within the conversational flow template corresponding to a last state reached during the executing of the dynamically generated state machine;

deleting the dynamically generated state machine;

receiving a subsequent natural language query via the user interface after the providing of the response via the user interface;

using the classification machine learning model to determine a corresponding intent identifier based on the subsequent natural language query;

dynamically generating a new state machine based on the corresponding intent identifier and the stored identifier of the block within the conversational flow template, wherein the dynamically generating of the new state machine comprises determining, based on the corresponding intent identifier and the stored identifier of the block within the conversational flow template, whether to use the conversational flow template or a different conversational flow template to dynamically generate the new state machine;

executing the dynamically generated new state machine in order to automatically generate a corresponding response to the subsequent natural language query; and providing the corresponding response via the user interface.

2. The method of claim 1, wherein the using of the classification machine learning model to determine the intent identifier based on the natural language query comprises:

providing one or more inputs to the classification machine learning model based on the natural language query; and receiving the intent identifier as an output from the classification machine learning model in response to the one or more inputs, wherein the classification machine learning model has been trained through a supervised learning process based on training data comprising natural language strings associated with labels indicating intent identifiers.

3. The method of claim 1, wherein the selecting, based on the intent identifier, the conversational flow template comprises selecting the conversational flow template from a plurality of conversational flow templates that are associated with intent identifiers.

4. The method of claim 1, further comprising determining one or more contextual data items related to the natural language query, wherein the executing of the dynamically generated state machine is based on the one or more contextual data items.

5. The method of claim 4, wherein the one or more contextual data items comprise one or more of:

a user attribute;

a device attribute; or application history data.

6. The method of claim 1, wherein the executing of the dynamically generated state machine comprises transitioning through states of the dynamically generated state machine until the state machine is complete or additional user input is needed.

7. The method of claim 6, wherein the executing of the dynamically generated state machine comprises transitioning through the states of the dynamically generated state machine until the additional user input is needed, and wherein the response comprises a request for the additional user input.

8. The method of claim 1, wherein the executing of the dynamically generated state machine comprises invoking one or more application programming interface (API) functions.

9. A system for dynamic state machine based conversational flow execution in a software application, comprising:

one or more processors; and a memory storing instructions that, when executed by the one or more processors, cause the system to:

receive a natural language query via a user interface;

determine an intent identifier based on the natural language query using a classification machine learning model trained through a supervised learning process comprising:

providing one or more training natural language strings to the classification machine learning model;

receiving one or more output intent identifiers produced by the classification machine learning model based on the training natural language strings; and iteratively modifying parameters of the classification machine learning model based on comparing the output intent identifiers to labels associated with the training natural language strings;

select, based on the intent identifier, a conversational flow template that specifies conversational logic via blocks and edges;

dynamically generate a state machine comprising:

an initial state corresponding to a point within the selected conversational flow template that is associated with the intent identifier; and one or more additional states and conditions generated based on a subset of the blocks and the edges of the conversational flow template;

execute the dynamically generated state machine in order to automatically generate a response to the natural language query;

provide the response via the user interface;

store an identifier of a block within the conversational flow template corresponding to a last state reached during the executing of the dynamically generated state machine;

delete the dynamically generated state machine;

receive a subsequent natural language query via the user interface after the providing of the response via the user interface;

use the classification machine learning model to determine a corresponding intent identifier based on the subsequent natural language query;

dynamically generate a new state machine based on the corresponding intent identifier and the stored identifier of the block within the conversational flow template, wherein the dynamically generating of the new state machine comprises determining, based on the corresponding intent identifier and the stored identifier of the block within the conversational flow template, whether to use the conversational flow template or a different conversational flow template to dynamically generate the new state machine;

execute the dynamically generated new state machine in order to automatically generate a corresponding response to the subsequent natural language query; and provide the corresponding response via the user interface.

10. The system of claim 9, wherein the using of the classification machine learning model to determine the intent identifier based on the natural language query comprises:

providing one or more inputs to the classification machine learning model based on the natural language query; and receiving the intent identifier as an output from the classification machine learning model in response to the one or more inputs, wherein the classification machine learning model has been trained through a supervised learning process based on training data comprising natural language strings associated with labels indicating intent identifiers.

11. The system of claim 9, wherein the selecting, based on the intent identifier, the conversational flow template comprises selecting the conversational flow template from a plurality of conversational flow templates that are associated with intent identifiers.

12. The system of claim 9, wherein the instructions, when executed by the one or more processors, further cause the system to determine one or more contextual data items related to the natural language query, wherein the executing of the dynamically generated state machine is based on the one or more contextual data items.

13. The system of claim 12, wherein the one or more contextual data items comprise one or more of:

a user attribute;

a device attribute; or application history data.

14. A non-transitory computer readable medium comprising instructions that, when executed by one or more processors of a computing system, cause the computing system to:

receive a natural language query via a user interface;

determine an intent identifier based on the natural language query using a classification machine learning model trained through a supervised learning process comprising:

providing one or more training natural language strings to the classification machine learning model;

receiving one or more output intent identifiers produced by the classification machine learning model based on the training natural language strings; and iteratively modifying parameters of the classification machine learning model based on comparing the output intent identifiers to labels associated with the training natural language strings;

select, based on the intent identifier, a conversational flow template that specifies conversational logic via blocks and edges;

dynamically generate a state machine comprising:

an initial state corresponding to a point within the selected conversational flow template that is associated with the intent identifier; and one or more additional states and conditions generated based on a subset of the blocks and the edges of the conversational flow template;

execute the dynamically generated state machine in order to automatically generate a response to the natural language query;

provide the response via the user interface;

store an identifier of a block within the conversational flow template corresponding to a last state reached during the executing of the dynamically generated state machine;

delete the dynamically generated state machine;

receive a subsequent natural language query via the user interface after the providing of the response via the user interface;

use the classification machine learning model to determine a corresponding intent identifier based on the subsequent natural language query;

dynamically generate a new state machine based on the corresponding intent identifier and the stored identifier of the block within the conversational flow template, wherein the dynamically generating of the new state machine comprises determining, based on the corresponding intent identifier and the stored identifier of the block within the conversational flow template, whether to use the conversational flow template or a different conversational flow template to dynamically generate the new state machine;

execute the dynamically generated new state machine in order to automatically generate a corresponding response to the subsequent natural language query; and provide the corresponding response via the user interface.

\* \* \* \* \*